Patented Feb. 16, 1954

2,669,563

UNITED STATES PATENT OFFICE 2,669,563

BISMUTH SALT OF PENICILLIN

Simon L. Ruskin, New York, N. Y.

No Drawing. Original application January 4, 1945, Serial No. 571,351. Divided and this application August 8, 1951, Serial No. 240,977

1 Claim. (Cl. 260—239.1)

The present invention relates to the manufacture of penicillin compounds with bismuth.

It is the general object of the invention to provide therapeutic compounds containing bismuth having an enhanced spirocheticidal and/or trypanosomicidal action coupled with a diminished reaction on injection.

It is a further object of the invention to provide bismuth compounds of penicillin wherein the latter apparently retains its bactericidal or bacteriostatic action despite the presence of the heavy metals.

A still further object of the invention is to provide preparations of the penicillin compounds of bismuth which have been stabilized in solution or suspension in a suitable vehicle.

Other objects and advantages of the invention will appear from the following more detailed description of the invention.

It is known that penicillin is inactivated in the presence of heavy metals. I have, however, found that the bismuth salt of penicillin may be prepared in which the penicillin acts as a superior carrier for the bismuth, so much so that lower dosages of the salt can be effectively utilized than is the case with known preparations of the same metal. This effect is probably due at least in part to the preservation of the normal activity of the penicillin; or it may be due to the greater compatibility of the penicillin salt of the otherwise toxic bismuth with the human tissues, which is evidenced by the reduced reaction when suspensions of the salts are injected; or it may be due to a combination of these causes. Thus I have found that 30 mg. of the bismuth salt of penicillin constitutes an effective dose for intramuscular injection twice weekly for the treatment of syphilis, Vincent's infection of the mouth (trench mouth), and other diseases for which bismuth is commonly employed, and is equivalent to about 30 mg. of sodium bismuth tartrate or of bismuth subsalicylate.

According to the invention, the bismuth compound is prepared by dissolving sodium penicillin in a polyhydric alcohol like glycerol or glycol, under aqueous conditions, and in the presence of a stabilizing agent like a sugar, such as sucrose, and adding a solution of a bismuth salt thereto. Under these conditions, the activity of the penicillin is preserved and the bismuth compound can be precipitated in an active form by neutralization of the mixture with a small amount of an alkali metal base like sodium hydroxide.

Satisfactory methods of preparing the compounds of the invention are illustrated by the following example:

EXAMPLE

*Preparation of bismuth-penicillin*

100 mg. ($1/3000$ mol.) sodium penicillin were dissolved in 10 cc. 30% glycerol and 10% sucrose and slowly treated under stirring with 485 mg. bismuth nitrate dissolved in 10 cc. 30% glycerol. On neutralization with a few drops of N.NaOH a yellow powder was obtained. It was separated by centrifugation and then washed with water, and finally with acetone by centrifugation.

Probable structure: $(C_{14}H_{17}NO_6)_2Bi(OH)$

The product may be dissolved by warming it with monoethanolamine. Enough monoethanolamine was used to bring up the concentration to 30 mg. of bismuth per cc.

The stability of the compounds of the present invention in solution in an ampule, may, as I have found, be improved by the use of various mono and disaccharides, like sorbose, mannose, sucrose, glucose, dextrose, etc., and by various sugar acids and their salts like glucuronic acid and ascorbic acid, both laevo and dextro, and also by various sulphur-free amino acids like histidine, lysine, argenine, and other sulphur-free amino acids produced in the metabolic or hydrolytic decomposition of protein substances. I have found that the synthetically produced dextro forms of these sulphur-free amino acids are generally more effective as stabilizers than the natural laevo forms. Thus, dextrohistidine is considerably more effective than laevo-histidine. All of these stabilizers are preferably used in excess of equi-molecular amounts in relation to the metal compound of penicillin and in general concentrations of 3–5 per cent of the stabilizer will be sufficient.

By the term sugar acids as employed herein is understood the carboxylic and lactone derivatives of various sugars. In place of the free acids the soluble salts thereof may be employed, such as the sodium and calcium salts.

This application is a division of my prior application Serial No. 571,351 filed January 4, 1945, now abandoned.

I claim:

A bismuth salt of penicillin.

SIMON L. RUSKIN.

References Cited in the file of this patent

UNITED STATES PATENTS

| Number | Name | Date |
|---|---|---|
| 2,449,039 | Libby | Sept. 7, 1948 |
| 2,461,949 | Wintersteiner et al. | Feb. 15, 1949 |
| 2,530,372 | Bohls | Nov. 21, 1950 |

OTHER REFERENCES

Forgan: "The Lancet," Jan. 27, 1945, page 129.

Abraham: "British Journal of Exptl. Pathology," vol. 23, June 1942, page 108.

Monash: "Science," vol. 107, Oct. 17, 1947, page 370.